(12) United States Patent
Li et al.

(10) Patent No.: US 11,483,261 B2
(45) Date of Patent: Oct. 25, 2022

(54) DATA PACKET PROCESSING METHOD AND APPARATUS, AND DEVICE

(71) Applicants: Huawei Technologies Co., Ltd., Shenzhen (CN); TSINGHUA UNIVERSITY, Beijing (CN)

(72) Inventors: Yong Li, Beijing (CN); Mingyang Zhang, Hong Kong (CN); Huan Yan, Beijing (CN); Longyu Cao, Shanghai (CN); Depeng Jin, Beijing (CN)

(73) Assignees: Huawei Technologies Co., Ltd., Shenzhen (CN); TSINGHUA UNIVERSITY, Beijing (CN)

( * ) Notice: Subject to any disclaimer, the term of this patent is extended or adjusted under 35 U.S.C. 154(b) by 101 days.

(21) Appl. No.: 17/014,670

(22) Filed: Sep. 8, 2020

(65) Prior Publication Data
US 2020/0403941 A1 Dec. 24, 2020

Related U.S. Application Data

(63) Continuation of application No. PCT/CN2019/081976, filed on Apr. 9, 2019.

(30) Foreign Application Priority Data

Apr. 9, 2018 (CN) .......................... 201810313392.5

(51) Int. Cl.
*H04L 49/9005* (2022.01)
*H04L 45/745* (2022.01)
*H04L 67/568* (2022.01)

(52) U.S. Cl.
CPC ........ *H04L 49/9005* (2013.01); *H04L 45/745* (2013.01); *H04L 67/568* (2022.05)

(58) Field of Classification Search
CPC ............... H04L 49/9005; H04L 45/745; H04L 67/2842; H04L 49/9047; H04L 49/9084;
(Continued)

(56) References Cited

U.S. PATENT DOCUMENTS 10,230,810 B1 * 3/2019 Bhide ................. H04L 67/2804
2015/0172103 A1 6/2015 Decusatis et al.
(Continued)

FOREIGN PATENT DOCUMENTS

CN 104821923 A 8/2015
CN 105379206 A 3/2016
(Continued)

OTHER PUBLICATIONS

Protecting SDN Controller with Per-Flow Buffering inside Open Flow Switches, A. Volkan et al, IEEE, 2017 (Year: 2017).*
(Continued)

*Primary Examiner* — Habte Mered
(74) *Attorney, Agent, or Firm* — Leydig, Voit & Mayer, Ltd.

(57) ABSTRACT

Embodiments of the present invention disclose a data packet processing method and apparatus, and a device. The method includes: if a first data packet is received, determining a first cache queue that is in the first buffer and that is used to store the first data packet; buffering the first data packet in the second buffer if a state of the first cache queue is an invalid state, where a data amount of the first data packet is less than the capacity of the second buffer, and the state of the first cache queue is set to the invalid state when a current data amount of the first buffer reaches the capacity of the first buffer; and if a data amount of the second buffer reaches the capacity of the second buffer, sending all data packets that are in the second buffer to a control plane device.

11 Claims, 7 Drawing Sheets

(58) Field of Classification Search
CPC ..... H04L 45/42; H04L 47/745; H04L 45/742; H04L 47/622
See application file for complete search history.

(56) References Cited

U.S. PATENT DOCUMENTS

| | | |
|---|---|---|
| 2015/0280927 A1 | 10/2015 | Liang et al. |
| 2016/0218957 A1* | 7/2016 | Liang ................... H04L 45/742 |
| 2016/0344623 A1 | 11/2016 | Banikazemi et al. |
| 2017/0171114 A1* | 6/2017 | Dao .................... H04L 67/2842 |
| 2017/0295074 A1* | 10/2017 | Chandran ............. H04L 43/026 |
| 2020/0351211 A1* | 11/2020 | Kunz ................... H04L 47/283 |
| 2021/0092153 A1* | 3/2021 | Wei ..................... H04L 63/1458 |

FOREIGN PATENT DOCUMENTS

| | | |
|---|---|---|
| CN | 105553880 A | 5/2016 |
| CN | 105591977 A | 5/2016 |
| CN | 105791129 A | 7/2016 |
| CN | 105791169 A | 7/2016 |
| CN | 106603409 A | 4/2017 |
| CN | 107181663 A | 9/2017 |
| CN | 107484439 B | 11/2020 |
| WO | 2017071834 A1 | 5/2017 |
| WO | 2018006929 A1 | 1/2018 |

OTHER PUBLICATIONS

Buffer Management for Reducing Packet-In Messages in OpenFlow Switches, Z. Shang eat al, IEEE, 2019 (Year: 2019).*

* cited by examiner

DATA PACKET PROCESSING METHOD AND APPARATUS, AND DEVICE

CROSS-REFERENCE TO RELATED APPLICATIONS

This application is a continuation of International Application No. PCT/CN2019/081976, filed on Apr. 9, 2019, which claims priority to Chinese Patent Application No. 201810313392.5, filed on Apr. 9, 2018. The disclosures of the aforementioned applications are hereby incorporated by reference in their entireties.

TECHNICAL FIELD

Embodiments of the present invention relate to communications technologies, and in particular, to a data packet processing method and apparatus, and a device.

BACKGROUND

Software-defined networking (SDN) is a network system architecture of a new type and that separates a forwarding plane device from a control plane device, to flexibly control network traffic and provide a favorable platform for core network innovation and application innovation. In the SDN network architecture, the forwarding plane device interacts with the control plane device by using a standard southbound interface, where OpenFlow is a most widely used southbound interface protocol currently. In an OpenFlow protocol-based SDN network architecture, the control plane device is configured to send a flow table to the forwarding device, and the forwarding plane device is configured to perform a data packet processing operation (for example, forwarding, discarding, or modification) based on the flow table. One flow table includes at least one flow entry, and each flow entry includes at least a match field and a processing action. In actual application, if receiving a data packet, the forwarding plane device matches a field (for example, a field in a header) in the data packet with the flow table in the forwarding plane device. If a match field that matches the field in the data packet exists in the flow table of the forwarding plane device, the forwarding plane device performs a processing operation on the data packet based on a processing action corresponding to the match field. If no match field that matches the field in the data packet exists in the flow table of the forwarding plane device, the forwarding plane device needs to buffer the received data packet into a buffer. However, after a data amount of the buffer of the forwarding plane device reaches the capacity of the buffer, the forwarding plane device needs to send subsequently received data packets that do not match the flow table to the control plane device one by one. Consequently, overheads of a link between the forwarding plane device and the control plane device are increased.

SUMMARY

Embodiments of the present invention provide a data packet processing method and apparatus, and a device. A second buffer is added to a forwarding plane device. When a data amount of a first buffer of the forwarding plane device reaches the capacity of the first buffer, a data packet is buffered in the second buffer of the forwarding plane device, to reduce overheads of a link between the forwarding plane device and a control plane device.

According to a first aspect, an embodiment of the present invention provides a data packet processing method, where the method is applied to a forwarding plane device, the forwarding plane device includes a first buffer and a second buffer, the first buffer includes at least one cache queue, and the method includes: if a first data packet is received, determining a first cache queue that is in the first buffer and that is used to store the first data packet; buffering the first data packet in the second buffer if a state of the first cache queue is an invalid state, where a data amount of the first data packet is less than the capacity of the second buffer, and the state of the first cache queue is set to the invalid state when a current data amount of the first buffer reaches the capacity of the first buffer; and if a data amount of the second buffer reaches the capacity of the second buffer, sending all data packets that are in the second buffer to a control plane device.

In this embodiment, the second buffer is added to the forwarding plane device. When the data amount of the first buffer of the forwarding plane device reaches the capacity of the first buffer, data packets that do not match a flow table do not need to be sent to the control plane device one by one, and the data packets that do not match the flow table are instead buffered in the second buffer. When the data amount of the second buffer reaches the capacity of the second buffer, all the data packets in the second buffer are sent to the control plane device in batches, thereby reducing a quantity of times of sending the data packets to the control plane device, so that the overheads of the link between the forwarding plane device and the control plane device can be reduced.

In an embodiment, the forwarding plane device receives a forwarding flow table sent by the control plane device, where the forwarding flow table is generated by the control plane device in response to all the data packets that are in the second buffer and that are sent by the forwarding plane device, receives a second data packet, and buffers the second data packet in the second buffer in response to the forwarding flow table if a data identifier of the second data packet matches a data identifier of any data packet in the first cache queue.

In this embodiment, the forwarding plane device may receive the forwarding flow table sent by the control plane device, and buffer the second data packet in the second buffer according to the forwarding flow table. The data identifier of the second data packet matches the data identifier of any data packet in the first cache queue; that is, the second data packet is data packets of a data flow corresponding to the first cache queue. It is indicated that after the state of the first cache queue is the invalid state, data packets that belong to the data flow corresponding to the first cache queue and that subsequently arrive at the forwarding plane device are first buffered in the second buffer, and then the data packets buffered in the second buffer are sent to the control plane device. Because a principle of processing data packets by the control plane device is first in first out, the forwarding plane device also sends the data packets that are in the second buffer to the control plane device in the first in first out manner after the state of the first cache queue is the invalid state. Therefore, a forwarding sequence of data packets in a same data flow can be ensured according to the forwarding flow table.

In an embodiment, the forwarding plane device may receive a third data packet; determine that a cache queue used to store the third data packet does not exist in the first buffer, and that the data amount of the first buffer reaches the capacity of the first buffer; send the third data packet to the control plane device; receive a processing flow table sent by the control plane device, where the processing flow table is generated by the control plane device in response to the third data packet; delete the first cache queue if a current data amount of the first cache queue is zero; establish, in the first buffer and in response to the processing flow table, a second cache queue used to store the third data packet; and buffer the third data packet in the second cache queue.

In this embodiment, the forwarding plane device may receive the third data packet, and determine that the cache queue used to store the third data packet does not exist in the first buffer, and that the data amount of the first buffer reaches the capacity of the first buffer. It is indicated that the third data packet is an initial data packet of a data flow, that the forwarding plane device has not established a cache queue for the data flow corresponding to the third data packet, and that a data packet currently cannot be buffered in the first buffer. The forwarding plane device may send the third data packet to the control plane device. The forwarding plane device receives the processing flow table sent by the control plane device, establishes the second cache queue for the third data packet after deleting the first cache queue, and buffers, in the second cache queue and in response to the processing flow table, the third data packet.

In an embodiment, before performing the step of establishing, in the first buffer and in response to the processing flow table, a second cache queue used to store the third data packet, the forwarding plane device may further delete the forwarding flow table.

In this embodiment, the data packets in the data flow corresponding to the first cache queue arrive at the forwarding plane device earlier than the third data packet. To sequentially forward the data packets in the data flow corresponding to the first cache queue and the third data packet, execution priorities of the forwarding flow table and the processing flow table may be set, and an execution priority of the forwarding plane device is higher than an execution priority of the processing flow table. To be specific, when the second data packet is sent to the control plane device according to the forwarding flow table, and it is determined that a data amount of a third buffer of the control plane device is zero, the data packets that arrive at the forwarding plane device and that belong to the data flow corresponding to the first cache queue has been forwarded. The forwarding flow table has been executed and then is deleted. After the forwarding flow table is deleted, the forwarding plane device may perform the step of establishing, in the first buffer and in response to the processing flow table, a second cache queue used to store the third data packet, to wait for the control plane device to send a matching flow table corresponding to the second cache queue, so that the forwarding plane device forwards the data packet in the second cache queue according to the matching flow table corresponding to the second cache queue. Therefore, the data packets that first arrive at the forwarding plane device are forwarded first, thereby ensuring a forwarding sequence of different data flows.

In an embodiment, a first notification message is sent to the control plane device if the current data amount of the first cache queue is zero, where the first notification message is used to notify the control plane device that the current data amount of the first cache queue is zero. A second notification message sent by the control plane device is received, where the second notification message is generated after the control plane device forwards all data packets that are buffered in the control plane device and whose data identifiers each match a data identifier of the first data packet. The forwarding flow table is deleted in response to the second notification message.

In this embodiment, if the current data amount of the first cache queue is zero, it is determined that a matching flow table matching the data packets in the first cache queue exists in the forwarding plane device, and the data packets in the first cache queue are forwarded according to the matching flow table, the first notification message is sent to the control plane device, to notify the control plane device that the current data amount of the first cache queue is zero. The second notification message sent by the control plane device is received. The forwarding flow table is deleted in response to the notification message. Therefore, data packets that subsequently arrive and that belong to the data flow corresponding to the first cache queue can be processed according to the matching flow table, thereby improving data packet processing efficiency.

According to a second aspect, an embodiment of the present invention provides another data packet processing method, applied to a control plane device, where the method includes: receiving all data packets that are sent by a forwarding plane device and that are from a second buffer of the forwarding plane device; and buffering, in a third buffer, the received data packets that are from the second buffer, where the third buffer corresponds to the second buffer.

In this embodiment, the control plane device also has a buffer function. When receiving all the data packets that are from the second buffer of the forwarding plane device, the control plane device may buffer all the data packets that are from the second buffer. The forwarding plane device sends the data packets that are in the second buffer to the control plane device in batches, thereby reducing a quantity of times of receiving the data packets by the control plane device, and reducing load of processing the data packets by the control plane device.

In an embodiment, a forwarding flow table is generated in response to the received data packets that are from the second buffer, and the forwarding flow table is sent to the forwarding plane device.

In this embodiment, after the data packets in the second buffer are received, the forwarding flow table may be generated, and the forwarding flow table is sent to the forwarding plane device, so that the forwarding plane device may buffer the data packets according to the forwarding flow table, thereby ensuring a forwarding sequence of the data packets that are in the second buffer.

In an embodiment, a third data packet sent by the forwarding plane device is received, where the third data packet is forwarded when a cache queue used to store the third data packet does not exist in a first buffer of the forwarding plane device, and when a data amount of the first buffer reaches the capacity of the first buffer. A processing flow table is generated in response to the third data packet. The processing flow table is sent to the forwarding plane device.

In this embodiment, the control plane device may generate the processing flow table based on the third data packet, and send the processing flow table to the forwarding plane device, so that the forwarding plane device can buffer a data packet that matches the processing flow table.

In an embodiment, a first notification message sent by the forwarding plane device is received. It is determined, based on the first notification message, that a current data amount of a first cache queue of the forwarding plane device is zero. All data packets in the third buffer are forwarded to the forwarding plane device. A second notification message is sent, where the second notification message is used to notify the forwarding plane device that a current data amount of the third buffer is zero.

In this embodiment, data packets in the first cache queue arrive at the forwarding plane device earlier than the data packets in the third buffer of the control plane. After determining that the data packets in the first cache queue are forwarded, the control plane device may forward the data packets that are in the third buffer to the control plane device, so that the forwarding plane device can forward all the data packets that are in the third buffer, thereby ensuring a forwarding sequence of the data packets.

According to a third aspect, an embodiment of the present invention provides a data packet processing apparatus. The data packet processing apparatus has a function of implementing behavior in the implementations in the first aspect. The function may be implemented by hardware, or may be implemented by hardware executing corresponding software. The hardware or software includes one or more modules corresponding to the foregoing function. The module may be software and/or hardware. Based on a same inventive concept, for a problem-resolving principle and beneficial effects of the data packet processing apparatus, refer to the method implementations and the brought beneficial effects in the first aspect. Therefore, for implementations of the data packet processing apparatus, refer to the method implementations in the first aspect. Repeated content is not described again.

According to a fourth aspect, an embodiment of the present invention provides another data packet processing apparatus. The data packet processing apparatus has a function of implementing behavior in the implementations in the second aspect. The function may be implemented by hardware, or may be implemented by hardware executing corresponding software. The hardware or software includes one or more modules corresponding to the foregoing function. The module may be software and/or hardware. Based on a same inventive concept, for a problem-resolving principle and beneficial effects of the data packet processing apparatus, refer to the method implementations and the brought beneficial effects in the second aspect. Therefore, for implementations of the data packet processing apparatus, refer to the method implementations in the second aspect. Repeated content is not described again.

According to a fifth aspect, an embodiment of the present invention provides a forwarding plane device, where the forwarding plane device includes: a memory, configured to store one or more programs; and a processor, configured to invoke the programs stored in the memory, to implement the solution in the method design in the first aspect. For problem-resolving implementations and beneficial effects of the forwarding plane device, refer to the method implementations and the beneficial effects in the first aspect. Repeated content is not described again.

According to a sixth aspect, an embodiment of the present invention provides a control plane device, where the control plane device includes: a memory, configured to store one or more programs; and a processor, configured to invoke the programs stored in the memory, to implement the solution in the method design in the first aspect. For problem-resolving implementations and beneficial effects of the control plane device, refer to the method implementations and the beneficial effects in the second aspect. Repeated content is not described again.

According to a seventh aspect, an embodiment of the present invention provides a computer-readable storage medium, where the computer-readable storage medium stores a computer program, and when the computer program is executed by at least one processor, the implementations and beneficial effects in the first aspect can be implemented. Repeated content is not described again.

According to an eighth aspect, an embodiment of the present invention provides a computer-readable storage medium, where the computer-readable storage medium stores a computer program, and when the computer program is executed by at least one processor, the implementations and beneficial effects in the second aspect can be implemented. Repeated content is not described again.

According to a ninth aspect, an embodiment of the present invention provides a computer program product, where the computer program product includes a non-transitory computer-readable storage medium that stores a computer program, and the computer program is operable to enable a computer to implement the steps of the method in the first aspect. For problem-resolving implementations and beneficial effects of the computer program product, refer to the method implementations and the beneficial effects in the first aspect. Repeated content is not described again.

According to a tenth aspect, an embodiment of the present invention provides a computer program product, where the computer program product includes a non-transitory computer-readable storage medium that stores a computer program, and the computer program is operable to enable a computer to implement the steps of the method in the second aspect. For problem-resolving implementations and beneficial effects of the computer program product, refer to the method implementations and the beneficial effects in the second aspect. Repeated content is not described again.

BRIEF DESCRIPTION OF DRAWINGS

To describe the technical solutions in embodiments of the present invention more clearly, the following illustrates the accompanying drawings that need to be used in the embodiments of the present invention.

DESCRIPTION OF EMBODIMENTS

The following describes embodiments of the present invention with reference to the accompanying drawings in the embodiments of the present invention.

To better understand a data packet processing method and apparatus, and a device that are provided in the embodiments of the present invention, the following first describes a system architecture of the embodiments of the present invention.

Figure 1:
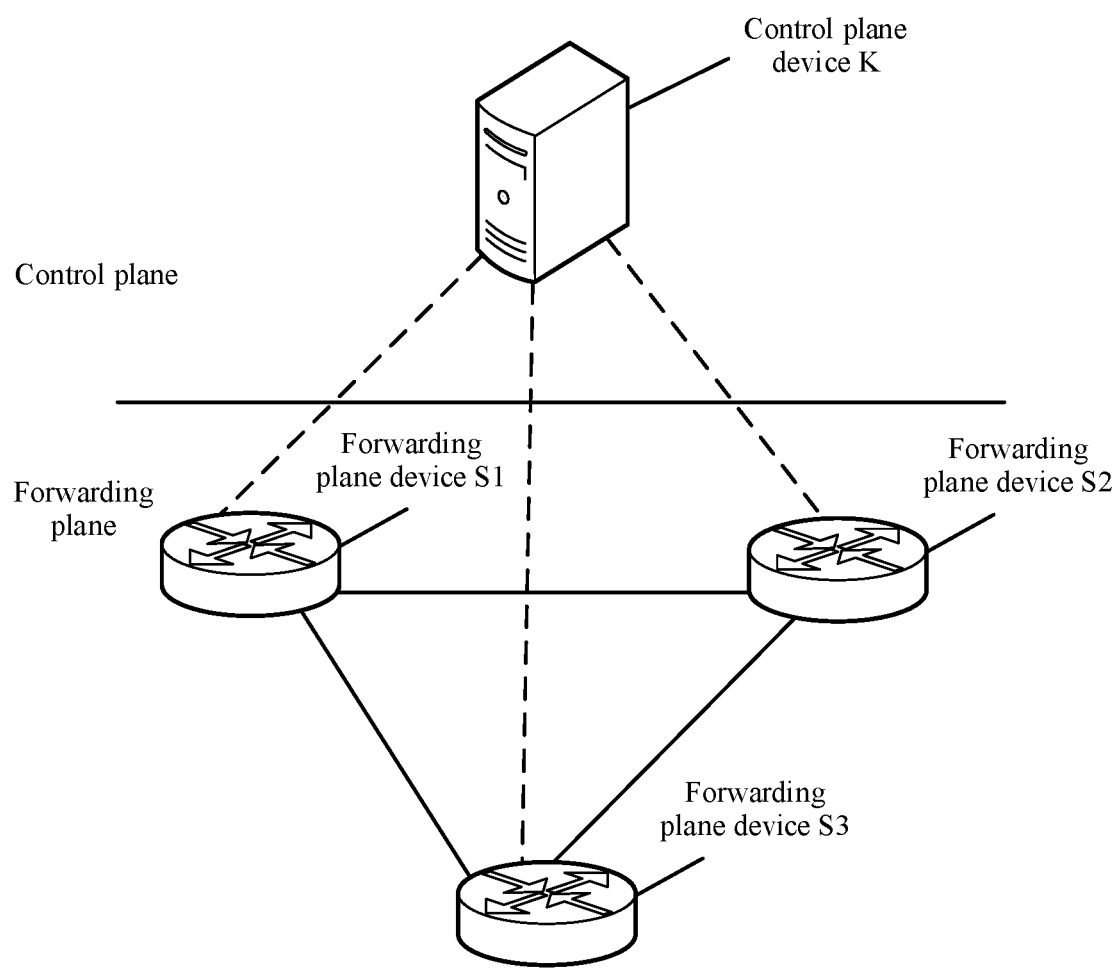
FIG. 1 is a schematic architectural diagram of a data packet processing system according to an embodiment of the present invention.

FIG. 1 is a schematic architectural diagram of a data packet processing system according to an embodiment of the present invention. An architecture of the data packet processing system shown in FIG. 1 may include a control plane device and at least one forwarding plane device. The control plane device forms a control plane, and the at least one forwarding plane device forms a forwarding plane. The control plane device is configured to send a flow table to the forwarding plane device, and the forwarding plane device is configured to perform operation processing on a received data packet according to the flow table. In FIG. 1, an example in which the data packet processing system includes three forwarding plane devices is used. A network connection may be established between a forwarding plane device S1, a forwarding plane device S2, a forwarding plane device S3, and a control plane device K, to perform data communication.

The forwarding plane device in this embodiment of the present invention may be a switch, a router, or another network device, and the control plane device may be a controller, for example, a server.

The forwarding plane devices and the control plane device all have a function of buffering a data packet. Each forwarding plane device includes a first buffer and a second buffer, where the first buffer includes at least one cache queue. A manner in which one forwarding plane device (using the forwarding plane device S1 as an example) and the control plane device K buffer data packets is as follows: The forwarding plane device S1 receives a first data packet that does not match the flow table, and searches the first buffer for a cache queue used to store the first data packet. If a first cache queue used to store the first data packet is found, and when a state of the first cache queue is invalid, it is indicated that a data amount of the first buffer reaches the capacity of the first buffer, and that a data packet currently cannot be buffered in the first cache queue. The forwarding plane device S1 buffers the first data packet in the second buffer. After a plurality of data packets are stored in the second buffer, if a data amount of the second buffer reaches the capacity of the second buffer, all data packets in the second buffer are sent to the control plane device K, and the control plane device K buffers the received data packets that are from the second buffer. The second buffer is added to the control plane device S1. When the data amount of the first buffer reaches the capacity of the first buffer, the forwarding plane device S1 does not need to send subsequently received data packets to the control plane device K one by one. The forwarding plane device S1 buffers the data packets in the second buffer. When a quantity of second buffers reaches the second buffer, the forwarding plane device S1 sends the data packets that are in the second buffer to the control plane device K in batches, thereby reducing a quantity of times of sending the data packets to the control plane device K, so that overheads of a link between the forwarding plane device and the control plane device can be reduced.

It should be noted that one data flow includes at least a plurality of data packets, and data identifiers of the data packets in the same flow match each other. A data identifier may be a field in a data packet or a number of a data packet, where the field may be at least one of a source address field, a destination address field, or a receive port field. The source address field includes an identifier corresponding to a sending device that sends the data packet, for example, an IP address of the sending device. The destination address field includes an identifier corresponding to a receiving device that receives the data packet, for example, an IP address of the receiving device. The receive port field includes a number of a port on which the forwarding plane device receives the data packet. The number of the data packet may be set for determining the data flow corresponding to the data packet.

The state of the first cache queue may be set based on the data amount of the first buffer. For example, when the first cache queue is established, the state of the first cache queue may be set to a valid state, where the valid state indicates that a data packet may further be buffered in the first cache queue. When the data amount of the first buffer reaches the capacity of the first buffer, and a data packet whose data identifier matches a data identifier of any data packet in the first cache queue is received, the state of the first cache queue is set to the invalid state, where the invalid state indicates that a data packet currently cannot be buffered in the first cache queue. In addition, after the state of the first cache queue is set to the invalid state, until the first cache queue is deleted, the state of the first cache queue always remains invalid.

For example, it is assumed that the total capacity of the first buffer is 100 M, the first buffer includes three cache queues: a (that is, the first cache queue), b, and c, current data amounts of the three cache queues a, b, and c are 20 M, 30 M, and 30 M respectively, and a current data amount of the first buffer is 80 M. The current data amount of the first buffer does not reach the capacity of the first buffer. If a data packet F1 (whose data amount is 10 M) is received, and a cache queue used to store the data packet F1 is not found in the first buffer, a cache queue d used to store the data packet F1 is established in the first buffer, a state of the cache queue d is set to the valid state, and the data packet F1 is buffered in the cache queue d. After the data packet F1 is buffered, a data amount of the first buffer is 90 M. In this case, if a data packet F2 (whose data amount is 10 M) is received, and it is found that a cache queue used to store the data packet F2 is the cache queue a, the data packet F2 is buffered in the first cache queue. After the data packet F2 is buffered, a data amount of the first buffer is 100 M; to be specific, the current data amount of the first buffer reaches the capacity of the first buffer, and a state of the cache queue a is set to the invalid state. In addition, after the state of the cache queue a is set to the invalid state, until the cache queue a is deleted, the state of the cache queue a always remains invalid.

Figure 2A:
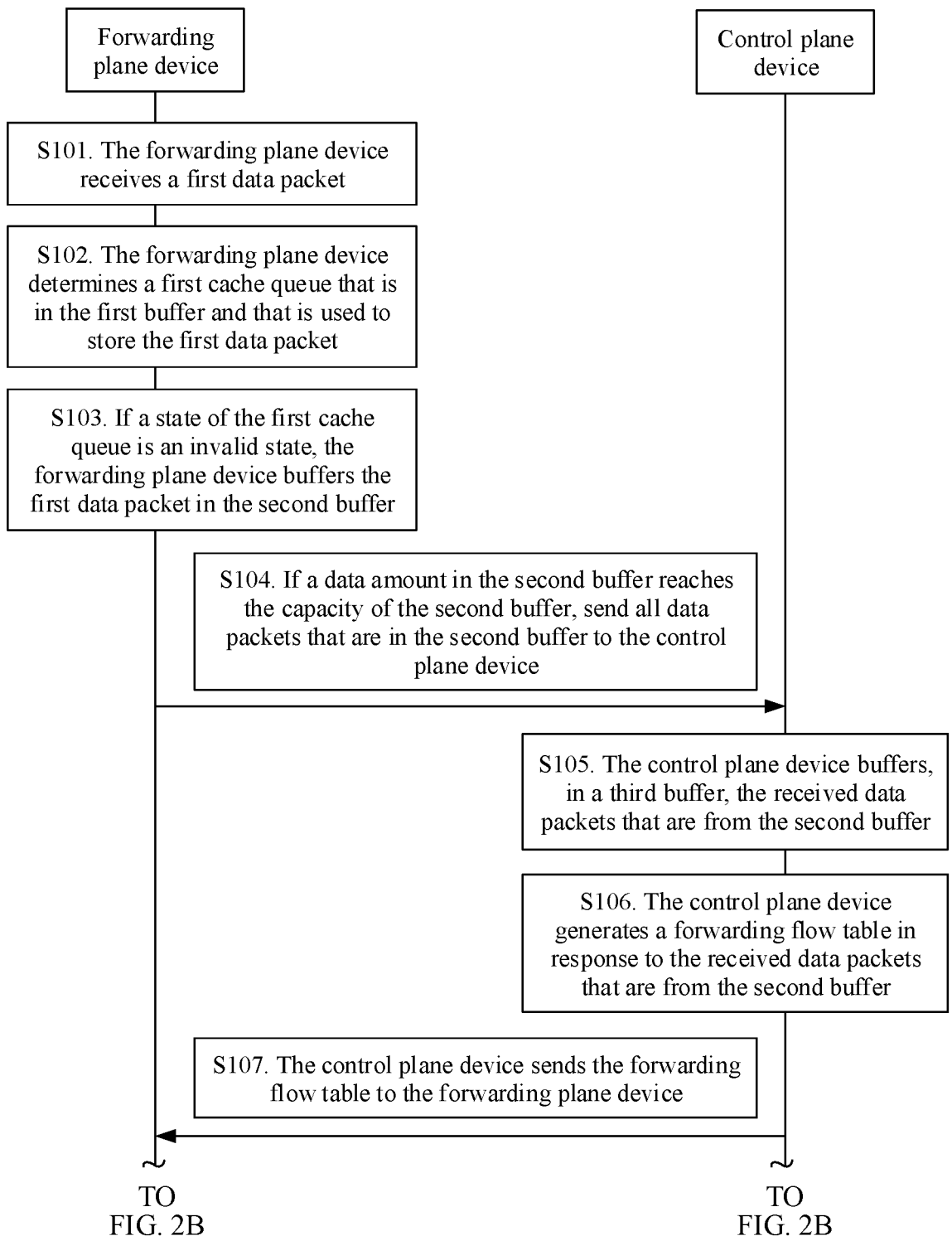
FIG. 2A, FIG. 2B, and FIG. 2C are a schematic flowchart of a data packet processing method according to an embodiment of the present invention.
Figure 2B:
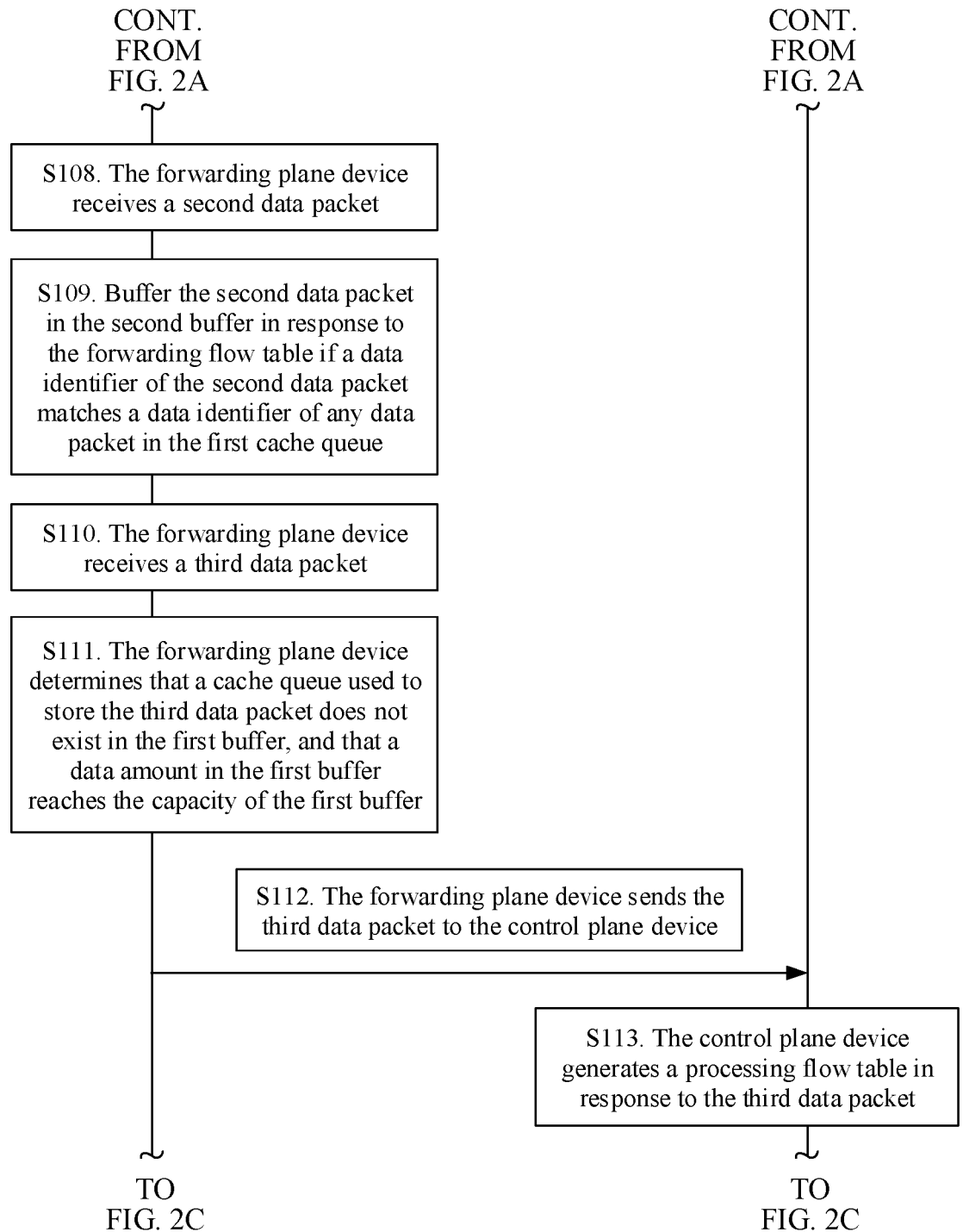
Figure 2C:
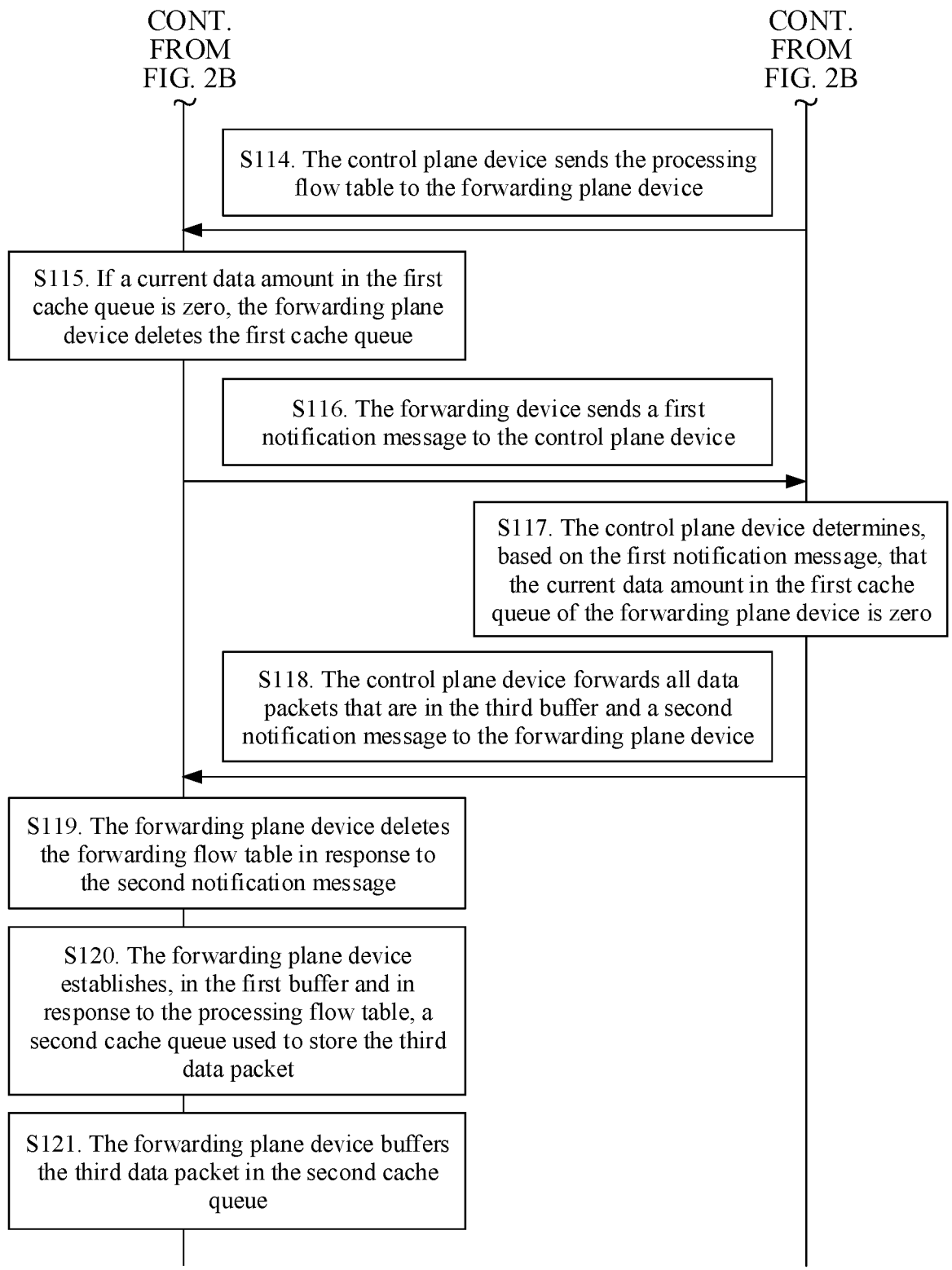

Based on the foregoing descriptions of the architecture of the data packet processing system, an embodiment of the present invention provides a data packet processing method. Referring to FIG. 2A, FIG. 2B, and FIG. 2C, the method is applied to the data packet processing system shown in FIG. 1, where the system includes at least a control plane device and a forwarding plane device, the forwarding plane device includes a first buffer and a second buffer, the first buffer includes at least one cache queue, and the method includes the following steps.

S101. The forwarding plane device receives a first data packet.

The forwarding plane device receives the first data packet, where the first data packet may be payment request data, web page request data, uploaded or downloaded data, or the like sent by a terminal.

S102. The forwarding plane device determines a first cache queue that is in the first buffer and that is used to store the first data packet.

The forwarding plane device may determine, based on a data identifier in the first data packet, and data identifiers of data packets that are in the first buffer, the first cache queue used to store the first data packet. Specifically, if the data identifier of the first data packet matches a data identifier of any data packet in the first cache queue, the first cache queue is used as a cache queue used to store the first data packet, and step S103 is performed. If the data identifier of the first data packet does not match the data identifiers of the data packets that are in the first buffer, it is determined that a cache queue used to store the first data packet does not exist in the first buffer, and it is indicated that the first data packet is an initial data packet of a data flow, and that the forwarding plane device has not established a cache queue for the first data packet. If the cache queue used to store the first data packet does not exist in the first buffer, and a data amount of the first buffer does not reach the capacity of the first buffer, a cache queue used to buffer the first data packet is established in the first buffer, and the first data packet is buffered in the newly created cache queue. If the cache queue used to store the first data packet does not exist in the first buffer, and a data amount of the first buffer reaches the capacity of the first buffer, the first data packet is sent to the control plane device.

For example, a data identifier may be a field of a data packet. If a source address field, a destination address field, and a receive port field of the first data packet respectively match a source address field, a destination address field, and a receive port field of any data packet in the first cache queue, the first cache queue is used as the first cache queue used to store the first data packet.

S103. The forwarding plane device buffers the first data packet in the second buffer if a state of the first cache queue is an invalid state, where a data amount of the first data packet is less than the capacity of the second buffer, and the state of the first cache queue is set to the invalid state when the current data amount of the first buffer reaches the capacity of the first buffer.

When the first cache queue used to store the first data packet exists in the first buffer, because the state of the first cache queue is used to indicate whether a data packet can further be buffered in the first cache queue, the state of the first cache queue may be viewed. If the state of the first cache queue is the invalid state, it is indicated that the data packet cannot be buffered in the first cache queue any more, and the first data packet may be buffered in the second buffer. If the state of the first cache queue is a valid state, the first data packet is buffered in the first cache queue.

It should be noted that, if the capacity of the second buffer is set to be excessively large (for example, 200 M), more (for example, 10) data packets may be buffered in the second buffer, but a longer time (for example, 10 ms) is required to enable a data amount of the second buffer to reach the capacity of the second buffer. Consequently, a delay of forwarding the data packets is relatively large. If the capacity of the second buffer is set to be excessively small (for example, 20 M), fewer (for example, one) data packets may be buffered in the second buffer; to be specific, a shorter time (for example, 1 ms) is required to enable a data amount of the second buffer to reach the capacity of the second buffer. Consequently, a quantity of times of sending the data packets by the forwarding plane device to the control plane device increases, and load of a link between the forwarding plane device and the control plane device increases. The forwarding plane device may comprehensively set a size of the second buffer based on the forwarding delay and the load of the link. The forwarding plane device may provide an external interface for adjusting the capacity of the second buffer. A user may adjust the capacity of the second buffer by using the external interface, to meet different requirements of the user.

S104. If the data amount of the second buffer reaches the capacity of the second buffer, the forwarding plane device sends all data packets that are in the second buffer to the control plane device.

If a data packet whose data identifier matches the data identifier of any data packet in the first cache queue is subsequently received, step S103 of buffering the data packet in the second buffer is repeatedly performed. Because the data amount of the first data packet is less than the capacity of the second buffer, after a plurality of data packets are buffered in the second buffer, if the data amount of the second buffer reaches the capacity of the second buffer, the forwarding plane device may send all data packets that are in the second buffer to the control plane device. Compared with a conventional solution: Each time a data packet that does not match a flow table is received, the unmatched data packet is directly sent to the control plane device, in this solution, the quantity of times of sending the data packets to the control plane device is reduced, and overheads of the link between the forwarding plane device and the control plane device are reduced. After the data packets in the second buffer are sent to the control plane, the data packets stored in the second buffer are cleared, the data amount of the second buffer is zero, and the second buffer may be used to buffer a subsequently received data packet.

For example, it is assumed that X data packets may be buffered in the second buffer. When the data amount of the first buffer (that is, a buffer space) reaches the capacity of the first buffer, X data packets that do not match the flow table are received. In the conventional solution, the X data packets are sent to the forwarding plane device with a need of being sent X times. In this solution, the X pieces of data are buffered in the second buffer, and the X data packets can be sent to the control plane device with a need of being sent only once, so that the quantity of times of sending the data packets to the control plane device can be reduced, and the overheads of the link between the forwarding plane device and the control plane device are reduced.

In an optional implementation, a specific manner in which the forwarding plane device sends all the data packets that are in the second buffer to the control plane device includes: that the forwarding plane device may send packet-in information of a first type to the control plane device, where the packet-in message of the first type includes at least all the data packets that are in the second buffer and a message type identifier (for example, a number 1), and the message type identifier is used to indicate that a cache queue used to store a data packet in the packet-in message of the first type exists in the first buffer.

S105. The control plane device may buffer, in a third buffer, the received data packets that are from the second buffer, where the third buffer corresponds to the second buffer.

The control plane device may receive all the data packets that are from the second buffer and that are sent by the forwarding plane device, and buffer, in the third buffer, the received data packets that are from the second buffer. The forwarding plane device sends the data packets that are in the second buffer to the control plane device in batches, thereby reducing a quantity of times of receiving the data packets by the control plane device, and reducing load of processing the data packets by the control plane device.

That the third buffer corresponds to the second buffer means that the data packets buffered in the second buffer and data packets buffered in the third buffer belong to a same data flow.

S106. The control plane device generates a forwarding flow table in response to the received data packets that are from the second buffer.

The control plane device may generate the forwarding flow table in response to the received data packets that are from the second buffer. The forwarding flow table includes at least a match field and a processing action, where the match field is generated by the control plane device based on a data identifier of one data packet in the second buffer, and the processing action is buffering a data packet in the second buffer. To be specific, the forwarding flow table is used to indicate the forwarding plane device to buffer a matched data packet in the second buffer when the forwarding plane device receives the data packet whose data identifier matches the data identifier of the data packet in the second buffer.

For example, the control plane device generates the match field of the forwarding flow table based on the data identifier of the data packet in the second buffer. The identifier of the data packet in the second buffer includes a field in the data packet, for example, a source IP address field, a target IP address field, or a field of a port (In port) on which the data packet is received. To be specific, the source IP address field, the destination IP address field, and the field of the port on which the data packet is received that are of the data packet in the second buffer are used as the match field of the forwarding flow table, and the processing action is set to buffering a data packet in the second buffer. For example, a value of the source IP address field that corresponds to the data packet that is in the second buffer is 101.224.112.01, a value of the target IP address that corresponds to the data packet that is in the second buffer is 126.136.134.221, and a port on which the data packet is received and that corresponds to the data packet that is in the second buffer is S1-1. The control plane device generates, in response to the data packet in the second buffer, a forwarding flow table shown in Table 1. The value of the source IP address field included in the match field of the forwarding flow table is 101.224.112.01, the value of the target IP address included in the match field of the forwarding flow table is 126.136.134.221, and the port on which the data packet is received and that is included in the match field of the forwarding flow table is S1-1. The processing action is set to buffering a data packet in the second buffer.

TABLE 1

| Match field | | | |
|---|---|---|---|
| In_port | Source IP address | Destination IP address | Processing action |
| S1-1 | 102.224.112.01 | 126.136.134.221 | Buffering a data packet in a second buffer |

S107. The control plane device sends the forwarding flow table to the forwarding plane device.

S108. The forwarding plane device receives a second data packet.

S109. The forwarding plane device buffers the second data packet in the second buffer in response to the forwarding flow table if a data identifier of the second data packet matches the data identifier of any data packet in the first cache queue.

If the data identifier of the second data packet matches the data identifier of any data packet in the first cache queue, and because data identifiers of the data packets in the second buffer match identifiers of data packets in the first cache queue, it is indicated that the data packets in the first cache queue, the data packets in the second buffer, and the second data packet are data packets in a same data flow. Therefore, the forwarding plane device buffers the second data packet in the second buffer in response to the forwarding flow table. This reflects that the forwarding plane device sends the data packets that are in the second buffer to the control plane device in a first in first out manner. Because the control plane device also processes the data packets in the first in first out manner, a forwarding sequence of the data packets in the same data flow is ensured according to the forwarding flow table sent by the control plane device.

S110. The forwarding plane device receives a third data packet.

S111. The forwarding plane device determines that a cache queue used to store the third data packet does not exist in the first buffer, and that the data amount of the first buffer reaches the capacity of the first buffer.

If the forwarding plane device determines that the cache queue used to store the third data packet does not exist in the first buffer, and that the data amount of the first buffer reaches the capacity of the first buffer, it is indicated that the third data packet is an initial data packet of a data flow, that the forwarding plane device has not established a cache queue for the data flow corresponding to the third data packet, and that a data packet currently cannot be buffered in the first buffer.

S112. The forwarding plane device sends the third data packet to the control plane device.

If determining that the cache queue used to store the third data packet does not exist in the first buffer, and that the data amount of the first buffer reaches the capacity of the first buffer, the forwarding plane device may send the third data packet to the control plane device, so that the control plane device may send a processing flow table based on the third data packet.

In an optional implementation, a specific manner in which the forwarding plane device sends the third data packet to the control plane device includes: sending, to the control plane device, a packet-in message that carries a specified flag value, where the packet-in message that carries the specified flag value includes at least the third data packet and the specified flag value. The specified flag value may be a value (for example, −1) of an invalid buffer address, and the specified flag value is used to indicate that the cache queue used to buffer the third data packet does not exist in the forwarding plane device. The specified flag value may be a value agreed on by the control plane device and the forwarding plane device, and is not limited to the value of the invalid buffer address.

S113. The control plane device generates the processing flow table in response to the third data packet.

The control plane device generates the processing flow table in response to the third data packet, where the processing flow table may include a match field and a processing action. The match field may be generated by the control plane device based on a data identifier of the third data packet, where the data identifier may include a field of the third data packet, for example, a source IP address field, a target IP address field, or a field of a port (In port) on which the data packet is received, and the processing action may be buffering the third data packet in the first buffer. For example, a value of the source IP address field that corresponds to the third data packet is 101.224.112.02, a value of the target IP address that corresponds to the third data packet is 126.136.134.222, and a port on which the data packet is received and that corresponds to the third data packet is S1-2. The control plane device generates, in response to the third data packet, a processing flow table shown in Table 2. The value of the source IP address field included in the match field of the processing flow table is 101.224.112.02, the value of the target IP address included in the match field of the processing flow table is 126.136.134.222, and the port on which the data packet is received and that is included in the match field of the processing flow table is S1-2. The processing action is set to buffering the third data packet in the first buffer.

TABLE 2

| Match field | | | |
|---|---|---|---|
| In_port | Source IP address | Destination IP address | Processing action |
| S1-2 | 102.224.112.02 | 126.136.134.222 | Buffering a third data packet in a first buffer |

S114. The control plane device sends the processing flow table to the forwarding plane device.

The control plane device may send the processing flow table to the forwarding plane device, so that the forwarding plane device may perform step S120 of establishing, in the first buffer, the cache queue used to buffer the third data packet.

S115. If a current data amount of the first cache queue is zero, the forwarding plane device deletes the first cache queue.

If receiving the data packets that are from the second buffer, the control plane device may send, to the forwarding plane device, a matching flow table corresponding to the data packets that are in the second buffer, where the matching flow table includes a match field and a processing action. The match field of the matching flow table matches the data identifiers (for example, fields) of the data packets that are in the second buffer. If the data identifiers of the data packets in the second buffer match the data identifiers of the data packets that are in the first cache queue, it is indicated that the data packets in the first cache queue match the matching flow table corresponding to the data packets that are in the second buffer, and the matching flow table may be used as a matching flow table of a data flow corresponding to the first cache queue. The forwarding plane device receives the matching flow table, and forwards, according to the matching flow table, the data packets in the first cache queue to a next forwarding device or a device corresponding to a destination IP address of the data packets. After the data packets in the first cache queue are forwarded, the data packets in the first cache queue are cleared. To be specific, the current data amount of the first cache queue is zero. The forwarding plane device may delete the first cache queue, so that a new cache queue can be established in the first buffer.

S116. The forwarding device sends a first notification message to the control plane device.

After the data packets in the first cache queue are cleared, the forwarding device may send the first notification message to the control plane device, to notify the control plane device that the current data amount of the first cache queue is zero.

For example, if the current data amount of the first cache queue is zero, the forwarding plane device may send the first notification message to the control plane device, where the first notification message may be a packet-in message of a second type, and the packet-in message of the second type includes at least a message type identifier (for example, a number 2), a cache identifier of the first cache queue (for example, an initial buffer address of the first cache queue).

S117. The control plane device determines, based on the first notification message, that the current data amount of the first cache queue of the forwarding plane device is zero.

S118. The control plane device forwards all data packets that are in the third buffer and a second notification message to the forwarding plane device.

Because the data packets in the first cache queue arrive at the forwarding plane device earlier than the data packets in the third buffer of the control plane, after the control plane device determines, by performing step S115, that the data packets in the first cache queue are forwarded by the forwarding plane device, the control plane device may forward all the data packets that are in the third buffer to the forwarding plane device, so that the forwarding plane device can forward all the data packets that are in the third buffer, thereby ensuring a forwarding sequence of the data packets.

For example, after the forwarding plane device receives the packet-in message of the second type, a packet-out message may be sent to the forwarding plane device for forwarding all the data packets that are in the third buffer.

After the control plane device forwards all the data packets that are in the third buffer to the forwarding plane device, a current data amount of the third buffer is zero, and the control plane device may send the second notification message to the forwarding plane device, to notify the forwarding plane device that the current data amount of the third buffer is zero.

S119. The forwarding plane device deletes the forwarding flow table in response to the second notification message.

The forwarding plane device receives the second notification message, and determines, based on the second notification message, that the data packets in the third buffer have been forwarded. The forwarding plane device may forward, based on the matching flow table corresponding to the data packets that are in the second buffer, the data packets that are in the third buffer to a next forwarding plane device or a device corresponding to a target IP address of the data packets, and determine that data packets that arrive at the forwarding plane device and that belong to the data flow corresponding to the first cache queue have been sequentially forwarded. The matching flow table of the data flow corresponding to the first cache queue currently exists in the forwarding plane device. Therefore, the forwarding plane device may process, according to the matching flow table, a data packet that subsequently arrives and that is of the data flow corresponding to the first cache queue, without needing to send the data packet to the second buffer for buffering, and may delete the forwarding flow table in response to the second notification message. This not only can ensure a data packet forwarding sequence, but also can improve data packet processing efficiency.

S120. The forwarding plane device establishes, in the first buffer and in response to the processing flow table, a second cache queue used to store the third data packet.

After deleting the forwarding flow table, the forwarding plane device may establish the second cache queue in the first buffer of the forwarding plane device, so that the third data packet and a data packet that subsequently arrives and that is of the data flow corresponding to the third data packet can be buffered in the second cache queue.

S121. The forwarding plane device buffers the third data packet in the second cache queue.

The data packets in the data flow corresponding to the first cache queue arrive at the forwarding plane device earlier than the third data packet. To sequentially forward the data packets in the data flow corresponding to the first cache queue and the third data packet, execution priorities of the forwarding flow table and the processing flow table may be set, and an execution priority of the forwarding plane device is higher than an execution priority of the processing flow table. To be specific, when the second data packet is sent to the control plane device according to the forwarding flow table, and it is determined that the data amount of the third buffer of the control plane device is zero, it is determined that the data packets that arrive at the forwarding plane device and that belong to the data flow corresponding to the first cache queue have been forwarded; that is, the forwarding flow table has been executed, and step S119 is performed to delete the forwarding flow table. After the forwarding flow table is deleted, the forwarding plane device may perform steps S120 and S121, to wait for the control plane device to send a matching flow table corresponding to the second cache queue, so that the forwarding plane device forwards the data packet in the second cache queue according to the matching flow table corresponding to the second cache queue. Therefore, the data packets that first arrive at the forwarding plane device are forwarded first, thereby ensuring a forwarding sequence of different data flows.

In this embodiment of the present invention, the forwarding plane device receives the first data packet, and determines the first cache queue used to store the first data packet. If the state of the first cache queue is the invalid state, the state of the first cache queue is set to the invalid state when the data amount of the first buffer reaches the capacity of the first buffer (that is, a current remaining storage space is insufficient). Therefore, when the state of the first cache queue is the invalid state, it is indicated that a data packet currently cannot be buffered in the first cache queue and the first buffer, and the first data packet may be buffered in the second buffer. When the data amount of the second buffer reaches the capacity of the second buffer, the forwarding plane device sends all the data packets that are in the second buffer to the control plane device, and the control plane device buffers, in the third buffer, the received data packets that are from the second buffer. The second buffer (namely, a buffer) is added to the forwarding plane device, and the third buffer is added to the control plane device. When the data amount of the first buffer (namely, a buffer space) of the forwarding plane device reaches the capacity of the first buffer, data packets that do not match a flow table do not need to be sent to the control plane device one by one, and are instead buffered in the second buffer. When the data amount of the second buffer reaches the capacity of the second buffer, all the data packets in the second buffer are sent to the control plane device in batches, thereby reducing the quantity of times of sending the data packets to the control plane device. Therefore, the overheads of the link between the forwarding plane device and the control plane device can be reduced, and the load of processing the data packets by the control plane device is reduced.

After buffering the received data packets that are from the second buffer, the control plane device generates the forwarding flow table based on the data packets in the second buffer, so that the forwarding plane device may buffer the second data packet in the second buffer according to the forwarding flow table. After the state of the first cache queue is the invalid state, data packets that subsequently arrive at the forwarding plane device and that are of the data flow are first buffered in the second buffer, and then the data packets buffered in the second buffer are sent to the control plane device. Because a principle of processing the data packets by the control plane device is first in first out, after the state of the first cache queue is the invalid state, the forwarding plane device also sends the data packets that are in the second buffer to the control plane device in the first in first out manner. Therefore, the forwarding sequence of the data packets in the same data flow can be ensured according to the forwarding flow table sent by the control plane device.

Figure 3:
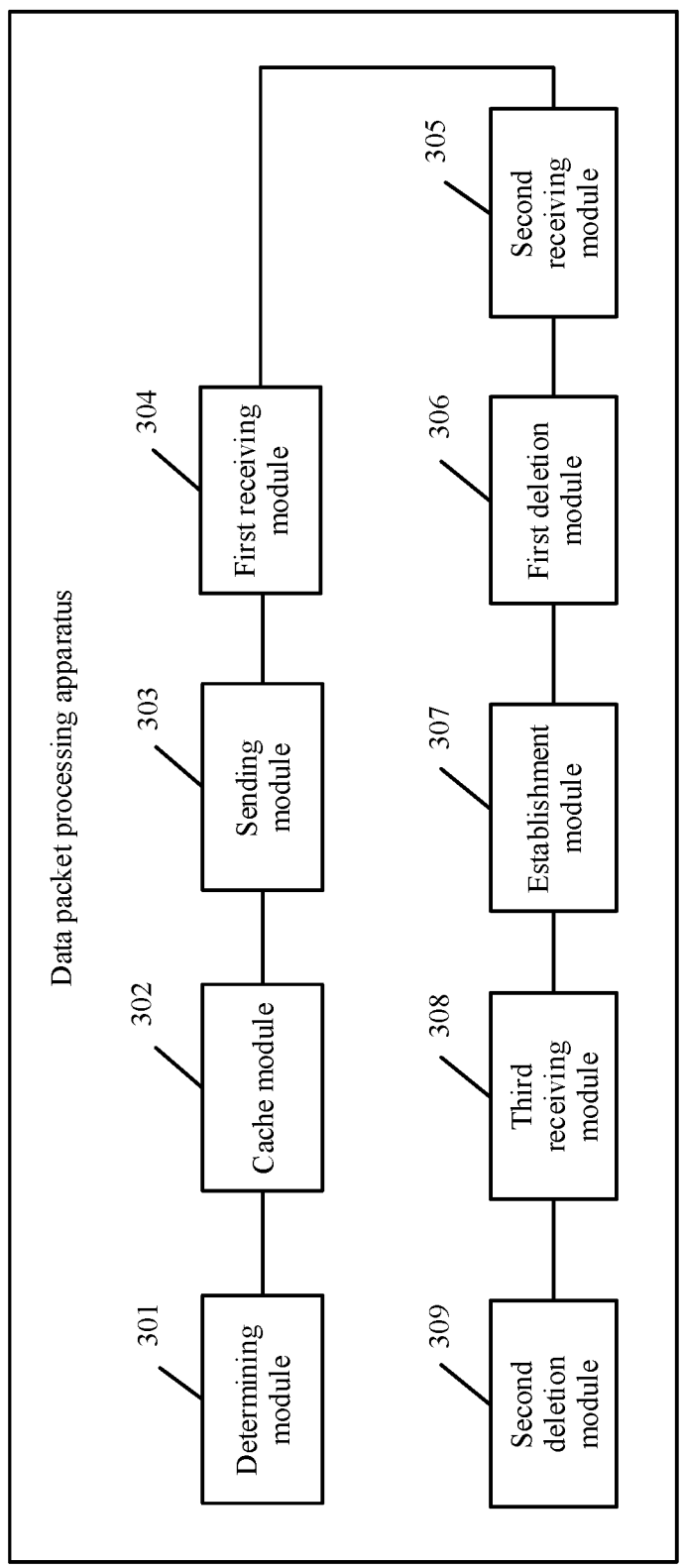
FIG. 3 is a schematic structural diagram of a data packet processing apparatus according to an embodiment of the present invention.

FIG. 3 is a schematic structural diagram of a data packet processing apparatus according to an embodiment of the present invention. The data packet processing apparatus described in this embodiment is applied to a forwarding plane device, where the forwarding plane device includes a first buffer and a second buffer, the first buffer includes at least one cache queue, and the apparatus includes:

a determining module 301, configured to: if a first data packet is received, determine a first cache queue that is in the first buffer and that is used to store the first data packet;

a cache module 302, configured to buffer the first data packet in the second buffer if a state of the first cache queue is an invalid state, where a data amount of the first data packet is less than the capacity of the second buffer, and the state of the first cache queue is set to the invalid state when a current data amount of the first buffer reaches the capacity of the first buffer; and a sending module 303, configured to: if a data amount of the second buffer reaches the capacity of the second buffer, send all data packets that are in the second buffer to a control plane device.

Optionally, a first receiving module 304 is configured to receive a forwarding flow table sent by the control plane device, where the forwarding flow table is generated by the control plane device in response to all the data packets that are in the second buffer and that are sent by the forwarding plane device.

Optionally, the first receiving module 304 is further configured to receive a second data packet.

Optionally, the cache module 302 is further configured to buffer the second data packet in the second buffer in response to the forwarding flow table if a data identifier of the second data packet matches a data identifier of any data packet in the first cache queue.

Optionally, a second receiving module 305 is further configured to receive a third data packet.

Optionally, the determining module 301 is further configured to determine that a cache queue used to store the third data packet does not exist in the first buffer, and that the data amount of the first buffer reaches the capacity of the first buffer.

Optionally, the sending module 303 is further configured to send the third data packet to the control plane device.

Optionally, the second receiving module 305 further receives a processing flow table sent by the control plane device, where the processing flow table is generated by the control plane device in response to the third data packet.

Optionally, a first deletion module 306 is configured to delete the first cache queue if a current data amount of the first cache queue is zero.

Optionally, an establishment module 307 is configured to establish, in the first buffer and in response to the processing flow table, a second cache queue used to store the third data packet.

Optionally, the cache module 302 is further configured to buffer the third data packet in the second cache queue.

Optionally, the first deletion module 306 is further configured to delete the forwarding flow table.

Optionally, the sending module 303 is further configured to send a first notification message to the control plane device if the current data amount of the first cache queue is zero, where the first notification message is used to notify the control plane device that the current data amount of the first cache queue is zero.

Optionally, a third receiving module 308 is further configured to receive a second notification message sent by the control plane device, where the second notification message is generated after the control plane device forwards all data packets that are buffered in the control plane device and whose data identifiers each match a data identifier of the first data packet.

Optionally, a second deletion module 309 is configured to delete the forwarding flow table in response to the second notification message.

In this embodiment of the present invention, the forwarding plane device receives the first data packet, and determines the first cache queue used to store the first data packet. If the state of the first cache queue is the invalid state, the state of the first cache queue is set to the invalid state when the data amount of the first buffer reaches the capacity of the first buffer (that is, a current remaining storage space is insufficient). Therefore, when the state of the first cache queue is the invalid state, it is indicated that a data packet currently cannot be buffered in the first cache queue and the first buffer, and the first data packet may be buffered in the second buffer. When the data amount of the second buffer reaches the capacity of the second buffer, the forwarding plane device sends all the data packets that are in the second buffer to the control plane device, and the control plane device buffers, in the third buffer, the received data packets that are from the second buffer. The second buffer (namely, a buffer) is added to the forwarding plane device, and the third buffer is added to the control plane device. When the data amount of the first buffer (namely, a buffer space) of the forwarding plane device reaches the capacity of the first buffer, data packets that do not match a flow table do not need to be sent to the control plane device one by one, and are instead buffered in the second buffer. When the data amount of the second buffer reaches the capacity of the second buffer, all the data packets in the second buffer are sent to the control plane device in batches, thereby reducing a quantity of times of sending the data packets to the control plane device. Therefore, overheads of a link between the forwarding plane device and the control plane device can be reduced, and load of processing the data packets by the control plane device is reduced.

Figure 4:
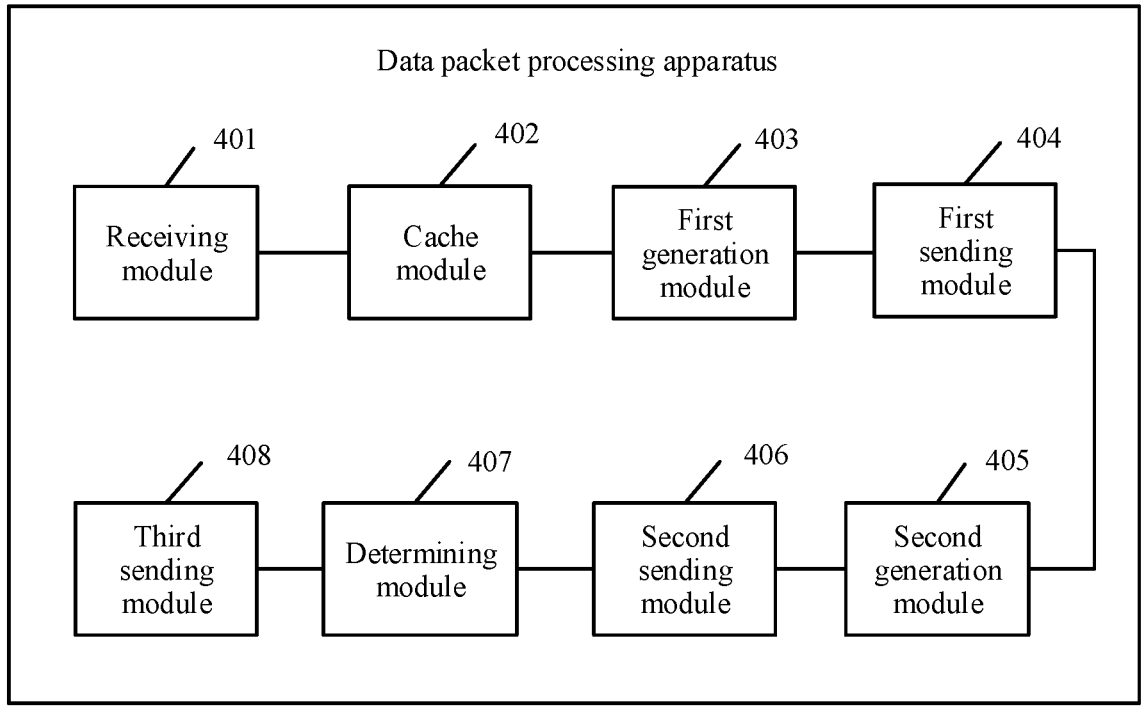
FIG. 4 is a schematic structural diagram of another data packet processing apparatus according to an embodiment of the present invention.

FIG. 4 is a schematic structural diagram of another data packet processing apparatus according to an embodiment of the present invention. The data packet processing apparatus described in this embodiment is applied to a control plane device, and the data packet processing apparatus includes:

a receiving module 401, configured to receive all data packets that are sent by a forwarding plane device and that are from a second buffer of the forwarding plane device; and a cache module 402, configured to buffer, in a third buffer, the received data packets that are from the second buffer, where the third buffer corresponds to the second buffer.

Optionally, a first generation module 403 is configured to generate a forwarding flow table in response to the received data packets that are from the second buffer.

Optionally, a first sending module 404 is configured to send the forwarding flow table to the forwarding plane device.

Optionally, the receiving module 401 is further configured to receive a third data packet sent by the forwarding plane device, where the third data packet is forwarded when a cache queue used to store the third data packet does not exist in a first buffer of the forwarding plane device, and when a data amount of the first buffer reaches the capacity of the first buffer.

Optionally, a second generation module 405 is configured to generate a processing flow table in response to the third data packet.

Optionally, a second sending module 406 is configured to send the processing flow table to the forwarding plane device.

Optionally, the receiving module 401 is further configured to receive a first notification message sent by the forwarding plane device.

Optionally, a determining module 407 is configured to determine, based on the first notification message, that a current data amount of a first cache queue of the forwarding plane device is zero.

Optionally, a third sending module 408 is configured to: forward all data packets that are in the third buffer to the forwarding plane device; and send a second notification message to the control plane device, where the second notification message is used to notify the forwarding plane device that a current data amount of the third buffer is zero.

In this embodiment of the present invention, the control plane device also has a buffer function. When receiving all the data packets that are from the second buffer of the forwarding plane device, the control plane device may buffer all the data packets that are from the second buffer, so that a quantity of times of sending the data packets to the control plane device can be reduced, overheads of a link between the forwarding plane device and the control plane device can be reduced, and load of processing the data packets by the control plane device is reduced.

Figure 5:
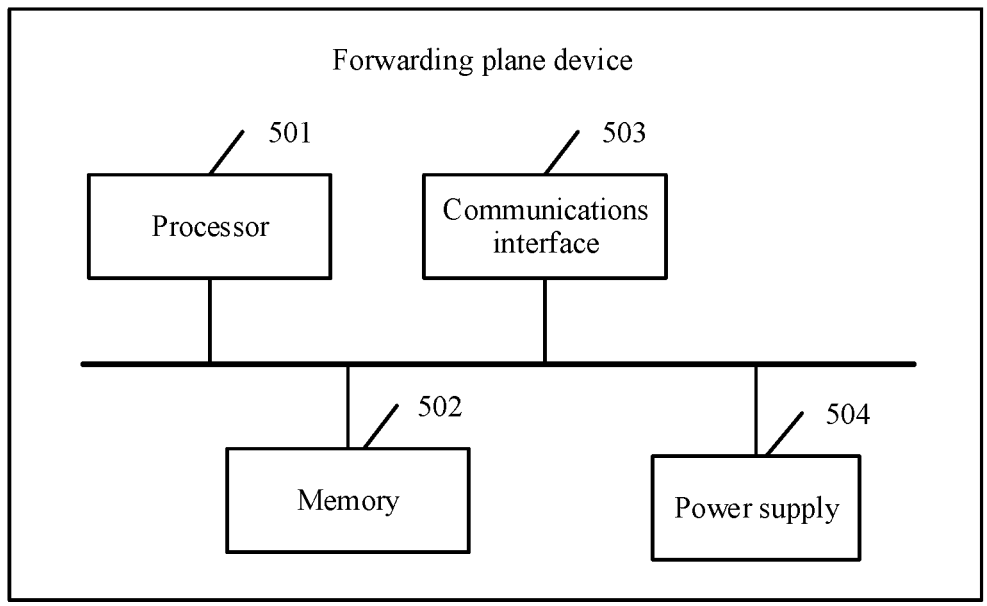
FIG. 5 is a schematic structural diagram of a forwarding plane device according to an embodiment of the present invention.

FIG. 5 is a schematic structural diagram of a forwarding plane device according to an embodiment of the present invention. The forwarding plane device includes a processor 501, a memory 502, a communications interface 503, and a power supply 504. The processor 501, the memory 502, the communications interface 503, and the power supply 504 are connected to each other by using a bus.

The processor 501 may be one or more CPUs. When the processor 501 is one CPU, the CPU may be a single-core CPU, or may be a multi-core CPU. The processor 501 may include a modem, configured to perform modulation or demodulation processing on a received signal received.

The memory 502 includes but is not limited to a RAM, a ROM, an EPROM, and a CD-ROM. The memory 502 is configured to store an instruction, an operating system, various applications, and data.

The communications interface 503 is connected to another forwarding plane device or a control plane device. For example, the communications interface 503 includes a plurality of interfaces that are separately connected to a plurality of terminals or a plurality of control devices. The communications interface 503 may be a wired interface, a wireless interface, or a combination thereof. The wired interface may be, for example, an Ethernet interface. The Ethernet interface may be an optical interface, an electrical interface, or a combination thereof. The wireless interface may be, for example, a wireless local area network (WLAN for short) interface, a cellular network interface, or a combination thereof.

The power supply 504 is configured to supply power to the forwarding plane device.

The memory 502 is further configured to store a program instruction. The processor 501 may invoke the program instruction stored in the memory 502, to implement the data packet processing method shown in the foregoing embodiments of this application.

Based on a same inventive concept, a problem-resolving principle of the forwarding plane device provided in this embodiment of the present invention is similar to that provided in the method embodiments of the present invention. Therefore, for implementations and beneficial effects of the forwarding plane device, refer to implementations and beneficial effects in the foregoing method embodiments. For brevity of description, details are not described herein again.

Figure 6:
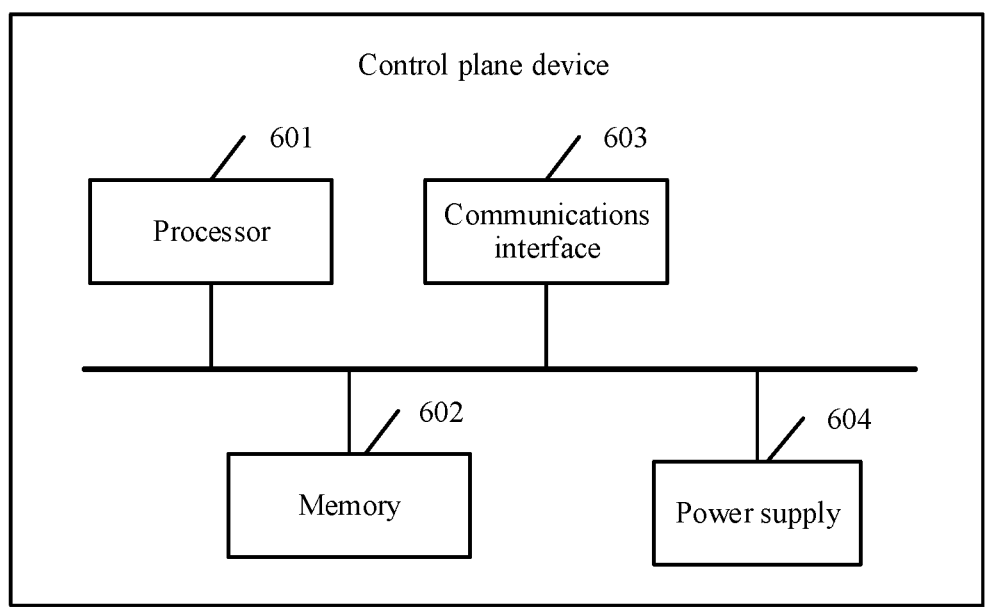
FIG. 6 is a schematic structural diagram of a control plane device according to an embodiment of the present invention.

FIG. 6 is a schematic structural diagram of a control plane device according to an embodiment of the present invention. The control plane device includes a processor 601, a memory 602, a communications interface 603, and a power supply 604. The processor 601, the memory 602, the communications interface 603, and the power supply 604 are connected to each other by using a bus.

The processor 601 may be one or more CPUs. When the processor 601 is one CPU, the CPU may be a single-core CPU, or may be a multi-core CPU. The processor 601 may include a modem, configured to perform modulation or demodulation processing on a received signal.

The memory 602 includes but is not limited to a RAM, a ROM, an EPROM, and a CD-ROM. The memory 602 is configured to store an instruction, an operating system, various applications, and data.

The communications interface 603 is connected to a forwarding plane device or another control plane device. For example, the communications interface 603 includes a plurality of interfaces that are separately connected to a plurality of terminals or a plurality of forwarding plane devices. The communications interface 603 may be a wired interface, a wireless interface, or a combination thereof. The wired interface may be, for example, an Ethernet interface. The Ethernet interface may be an optical interface, an electrical interface, or a combination thereof. The wireless interface may be, for example, a wireless local area network (WLAN for short) interface, a cellular network interface, or a combination thereof.

The power supply 604 is configured to supply power to the control plane device.

The memory 602 is further configured to store a program instruction. The processor 601 may invoke the program instruction stored in the memory 602, to implement the data packet processing method shown in the foregoing embodiments of this application.

Based on a same inventive concept, a problem-resolving principle of the control plane device provided in this embodiment of the present invention is similar to that provided in the method embodiments of the present invention. Therefore, for implementations and beneficial effects of the control plane device, refer to implementations and beneficial effects in the foregoing method embodiments. For brevity of description, details are not described herein again.

The present invention further provides a computer-readable storage medium, where the computer-readable storage medium stores a computer program. For problem-resolving implementations and beneficial effects of the program, refer to the implementations and beneficial effects of the data packet processing method in FIG. 2A, FIG. 2B, and FIG. 2C. Repeated content is not described again.

An embodiment of the present invention further provides a computer program product, where the computer program product includes a non-volatile computer-readable storage medium that stores a computer program, and when the computer program is executed, a computer is enabled to perform the steps of the data packet processing method in the embodiment corresponding to FIG. 2A, FIG. 2B, and FIG. 2C. For problem-resolving implementations and beneficial effects of the computer program product, refer to the implementations and beneficial effects of the data packet processing method in FIG. 2A, FIG. 2B, and FIG. 2C. Repeated content is not described again.

A person of ordinary skill in the art may understand that all or some of the processes of the methods in the embodiments may be implemented by a computer program instructing relevant hardware. The program may be stored in a computer-readable storage medium. When the program is run, the processes of the methods in the embodiments may be included.

What is claimed is:

1. A data packet processing method, wherein the method is applied in a forwarding plane device, the forwarding plane device comprises a first buffer and a second buffer, the first buffer comprises at least one cache queue, and the method comprises:

when a first data packet is received, determining a first cache queue that is in the first buffer and that is used to store the first data packet;

buffering the first data packet in the second buffer when a state of the first cache queue is an invalid state, wherein a data amount of the first data packet is less than a capacity of the second buffer, and the state of the first cache queue is set to the invalid state when a current data amount of the first buffer reaches a capacity of the first buffer;

when a data amount of the second buffer reaches the capacity of the second buffer, sending all data packets that are in the second buffer to a control plane device, and thereafter:

receiving a forwarding flow table sent by the control plane device, wherein the forwarding flow table is generated by the control plane device in response to all the data packets that are in the second buffer and that are sent by the forwarding plane device;

receiving a second data packet; and buffering the second data packet in the second buffer in response to the forwarding flow table when a data identifier of the second data packet matches a data identifier of any data packet in the first cache queue.

2. The method according to claim 1, wherein the method further comprises:

receiving a third data packet;

determining that a cache queue used to store the third data packet does not exist in the first buffer, and that the data amount of the first buffer reaches the capacity of the first buffer;

sending the third data packet to the control plane device;

receiving a processing flow table sent by the control plane device, wherein the processing flow table is generated by the control plane device in response to the third data packet;

deleting the first cache queue when a current data amount of the first cache queue is zero;

establishing, in the first buffer and in response to the processing flow table, a second cache queue used to store the third data packet; and buffering the third data packet in the second cache queue.

3. The method according to claim 2, wherein before the establishing, in the first buffer and in response to the processing flow table, a second cache queue used to store the third data packet, the method further comprises:

deleting the forwarding flow table.

4. The method according to claim 1, wherein the method further comprises:
 sending a first notification message to the control plane device when the current data amount of the first cache queue is zero, wherein the first notification message is used to notify the control plane device that the current data amount of the first cache queue is zero;
 receiving a second notification message sent by the control plane device, wherein the second notification message is generated after the control plane device forwards all data packets that are buffered in the control plane device and whose data identifiers each match a data identifier of the first data packet; and
 deleting the forwarding flow table in response to the second notification message.

5. A data packet processing method, applied in a control plane device, the method comprising:
 receiving all data packets that are sent by a forwarding plane device and that are from a second buffer of the forwarding plane device;
 buffering, in a third buffer, the received data packets that are from the second buffer, wherein the third buffer corresponds to the second buffer,
 receiving a third data packet sent by the forwarding plane device, wherein the third data packet is forwarded when a cache queue used to store the third data packet does not exist in a first buffer of the forwarding plane device, and when a data amount of the first buffer reaches a capacity of the first buffer;
 generating a processing flow table in response to the third data packet and
 sending the processing flow table to the forwarding plane device.

6. The method according to claim 5, wherein the method further comprises:
 generating a forwarding flow table in response to the received data packets that are from the second buffer; and
 sending the forwarding flow table to the forwarding plane device.

7. A data packet processing method, applied in a control plane device, the method comprising:
 receiving all data packets that are sent by a forwarding plane device and that are from a second buffer of the forwarding plane device;
 buffering, in a third buffer, the received data packets that are from the second buffer, wherein the third buffer corresponds to the second buffer;
 generating a forwarding flow table in response to the received data packets that are from the second buffer; and
 sending the forwarding flow table to the forwarding plane device;
 receiving a first notification message sent by the forwarding plane device;
 determining, based on the first notification message, that a current data amount of a first cache queue of the forwarding plane device is zero;
 forwarding all data packets that are in the third buffer to the forwarding plane device; and
 sending a second notification message to the control plane device, wherein the second notification message is used to notify the forwarding plane device that a current data amount of the third buffer is zero.

8. A data packet processing apparatus, wherein the apparatus is included in a forwarding plane device, the forwarding plane device comprises a first buffer and a second buffer, the first buffer comprises at least one cache queue, and the apparatus comprises:
 a processor, configured to: when a first data packet is received, determine a first cache queue that is in the first buffer and that is used to store the first data packet;
 a cache, configured to buffer the first data packet in the second buffer when a state of the first cache queue is an invalid state, wherein a data amount of the first data packet is less than a capacity of the second buffer, and the state of the first cache queue is set to the invalid state when a current data amount of the first buffer reaches a capacity of the first buffer;
 a sending module, configured to: when a data amount of the second buffer reaches the capacity of the second buffer, send all data packets that are in the second buffer to a control plane device,
 a first receiving module, configured to receive a forwarding flow table sent by the control plane device, wherein the forwarding flow table is generated by the control plane device in response to all the data packets that are in the second buffer and that are sent by the forwarding plane device;
 the first receiving module is further configured to receive a second data packet and
 the cache is further configured to buffer the second data packet in the second buffer in response to the forwarding flow table if a data identifier of the second data packet matches a data identifier of any data packet in the first cache queue.

9. The apparatus according to claim 8, wherein
 a second receiving module is configured to receive a third data packet;
 the processor is further configured to determine that a cache queue used to store the third data packet does not exist in the first buffer, and that the data amount of the first buffer reaches the capacity of the first buffer;
 the sending module is further configured to send the third data packet to the control plane device;
 the second receiving module further receives a processing flow table sent by the control plane device, wherein the processing flow table is generated by the control plane device in response to the third data packet;
 the processor is configured to delete the first cache queue if a current data amount of the first cache queue is zero, and
 to establish, in the first buffer and in response to the processing flow table, a second cache queue used to store the third data packet; and
 the cache is further configured to buffer the third data packet in the second cache queue.

10. The apparatus according to claim 9, wherein the processor is further configured to delete the forwarding flow table.

11. The apparatus according to claim 8, wherein
 the sending module is further configured to send a first notification message to the control plane device when the current data amount of the first cache queue is zero, wherein the first notification message is used to notify the control plane device that the current data amount of the first cache queue is zero; and
 the apparatus further comprises:
 a third receiving module, configured to receive a second notification message sent by the control plane device, wherein the second notification message is generated after the control plane device forwards all data packets that are buffered in the control plane device and whose data identifiers each match a data identifier of the first data packet; and the processor is configured to delete the forwarding flow table in response to the second notification message.

* * * * *